United States Patent [19]

Hargrove et al.

[11] 4,062,811
[45] Dec. 13, 1977

[54] METHOD FOR PREPARING DESULFURIZATION CATALYST

[75] Inventors: John David Hargrove, Aldershot; Geoffrey Charles Stevens, London, both of England

[73] Assignee: The British Petroleum Company Limited, Sunbury-on-Thames, England

[21] Appl. No.: 690,061

[22] Filed: May 26, 1976

[30] Foreign Application Priority Data

June 27, 1975 United Kingdom ............... 27266/75

[51] Int. Cl.$^2$ ........................ B01J 23/10; B01J 23/78; B01J 23/84
[52] U.S. Cl. .................................. 252/462; 252/465; 252/468; 252/470
[58] Field of Search ................. 252/462, 465, 468, 470

[56] References Cited

U.S. PATENT DOCUMENTS

| | | | |
|---|---|---|---|
| 2,913,422 | 11/1959 | Reitmeier | 252/465 |
| 3,345,286 | 10/1967 | Kovach et al. | 252/465 X |
| 3,935,127 | 1/1976 | Conway | 252/465 |
| 3,976,561 | 8/1976 | Eyles | 208/216 |

Primary Examiner—W. J. Shine
Attorney, Agent, or Firm—Morgan, Finnegan, Pine, Foley & Lee

[57] ABSTRACT

Desulfurization catalyst comprising an iron group metal and a Group VIB metal is modified by refluxing with an aqueous solution of an alkali or alkaline earth metal, or a transition metal. The pore size distribution of the catalyst is improved.

1 Claim, No Drawings

METHOD FOR PREPARING DESULFURIZATION CATALYST

This invention relates to catalysts suitable for the hydrodesulphurisation of hydrocarbons, particularly petroleum hydrocarbons, and to their use.

The hydro-catalytic desulphurisation, or hydrofining, of petroleum fractions is a well established process. The catalysts used comprise a Group VIB metal compound (i.e., a compound of molybdenum, tungsten or chromium, particularly the first two) and an iron group metal compound (i.e., a compound of nickel, cobalt or iron, particularly the first two) on a refractory support. The group VIB metal may be present in an amount of 5-25% weight expressed as metal and the iron group metal in an amount of 1-10% weight expressed as metal. Until recently, the main interests have been in the desulphurisation of distillate petroleum fractions, but current emphasis is on the desulphurisation of residues. Residues not only contain larger quantities of sulphur and nitrogen compounds than distillate fractions, but they also contain asphaltenes and, frequently, metal compounds, particularly compounds of vanadium and nickel, and it is accepted that they are much more difficult feedstocks for hydrodesulphurisation processes. A good residue desulphurisation catalyst requires not only high activity for desulphurisation but also good selectivity to minimise hydrogen consumption and the formation of carbonaceous deposits, and a high tolerance for carbonaceous and/or metal deposits.

In residue desulphurisation, particular attention has been paid in recent years to the physical, as well as the chemical, characteristics of the catalysts used. It has now been established that micro-poroous catalysts, i.e., catalysts with a preponderance of pores below 300 A diameter, combine good desulphurisation activity with resonable life because there is less tendency for these micro-porous catalysts to pick up metals and asphaltenes present in the feed. Catalysts containing pores above 300 A diameter tend to pick up metals and to have a lower desulphurisation activity. This may be desirable in a preliminninary reactor or guard chamber but is less desirable in a main desulphurisation chamber.

Our copending application U.S. Ser. No. 631,459 filed Nov. 12, 1975 (now allowed) discloses a method for preparing a catalyst, suitable for the hydrodesulphurisation of hydrocarbons, comprising from 1-10% wt of an iron group metal and from 5-25% wt of a Group VIB metal on a refractory support in which the catalyst is treated with water free from added salts.

This treatment results in a modification of the pore size distribution of the catalyst to give an improved catalyst.

We have now discovered that the pore size distribution an be still further modified to give an improved catalyst by refluxing the catalyst with an aqueous solution of certain salts.

Thus according to one aspect of the present invention there is provided a method for preparing a catalyst, suitable for the hydrodesulphurisation of hydrocarbons, comprising from 1-10% weight of an iron group metal (as hereinbefore defined) and from 5-25% weight of a Group VIB metal (as hereinbefore defined) on a refractory support, the method comprising the step of refluxing the catalyst with an aqueous solution of an alkali or alkaline earth metal, a rare earth metal or a transition metal.

The quantities above are expressed as elements by weight of total catalyst but the elements will normally be present as compounds, particularly oxides or sulphides. Preferred combinations, before addition of the promoter, are cobalt and molybdenum, nickel and molybdenum, or nickel, cobalt and molybdenum, all originally present as oxides or sulphides, and nickel tungsten sulphide.

The refractory support may be one or more oxides of elements of Groups II to IV of the Periodic Table, particularly alumina, silica, or silica-alumina. A single oxide, particularly alumina, is preferred to limit side-reactions. The alumina may contain up to 5% wt of silica or phosphate to stabilise it and/or give the required pore characteristics. An alumina support means, therefore, one with at least 99% wt of alumina.

Sometimes, however, when treating petroleum residues, some hydrocracking and the production of lower-boiling products may be desirable in which case a support formed from two or more oxides would be preferred, particularly supports of 5-95% wt alumina and 95-5% wt silica.

The method of preparation of the catalyst as regards the iron group metal, the Group VIB metal and the support may follow standard practice. Thus the metals may be added by simultaneous or sequential impregnation with suitable salt solutions, followed by drying, calcination, and, if necessary, pre-sulphiding.

The salt of the alkali metal, alkaline earth metal or transition metal may be, for example, a sulphate, nitrate,, acetate or halide.

The refluxing with the aqueous solution of the salt is preferably carried out after the Group VIB metal compound and the iron group metal compound have been added and calcined.

The treatment may be for a period between 5 and 500 hours.

After treatment, the catalyst should be dried and calcined as before.

According to another aspect of the invention there is provided a process for the hydrocatalytic desulphurisation of hydrocarbon fractions containing sulphur compounds which process comprises contacting the fraction at elevated temperature and pressure in the presence of hydrogen with a catalyst comprising from 1-10% wt of an iron group metal, from 5-25% wt of a Group VIB metal (as hereinbefore defined) and from 0.1 to 15% wt of an alkali metal, an alkaline earth metal, a rare earth metal of a transition metal on a refractory support, all weights being by weight of total catalyst, the catalyst having been refluxed with an aqueous solution of a salt of the alkali metal, alkaline earth metal or transition metal, as hereinbefore described.

The feedstocks may be any sulphur containing hydrocarbon fraction, particularly petroleum fractions. They may be atmospheric distillate fractions, i.e., fractions boiling in the range 50°-350° C, but, preferably, they contain at least 25% wt of material boiling above 350° C and more particularly at least 25% wt of material boiling above 550° C. Particularly preferred feedstocks are atmospheric and vacuum residues boiling above 350° C although wax distillates boiling within the range 350°-550° C and crude oils may also be treated. Depending on the original crude oil source the feedstocks may contain 1-8% wt sulphur, 0-1% wt nitrogen, 10-1,000 p.p.m. by weight of metals and 1-20% wt of asphaltenes. The preferred feedstocks are straight run fractions, but products from previous treatment processes may also be used, e.g., visbreaker distillates or residues, and cat cracker cycle oils.

The feedstock may also, if desired, be given a preliminary treatment to remove asphaltenes and/or metal compounds.

The desulphurisation process conditions may be chosen from the following ranges:

| Distillates | | Broad Range | Preferred Range |
| --- | --- | --- | --- |
| Temperature | °C | 150–500 | 250–430 |
| Pressure | bars gauge | 5–250 | 10–170 |
| Space Velocity | v/v/hr | 1–20 | 2–16 |
| Hydrogen gas rate | m³/m³ | 20–2000 | 25–250 |

| Atmospheric and Vacuum Residues | | | |
| --- | --- | --- | --- |
| Temperature | °C | 150–500 | 250–430 |
| Pressure | bars gauge | 10–250 | 37–170 |
| Space Velocity | v/v/hr | 0.1–20 | 0.3–15 |
| Hydrogen gas rate | m³/m³ | 50–2000 | 75–1000 |

These variables may be adjusted in known manner depending on the level of desulphurisation required.

The manufacture of catalysts with the preferred physical characteristics is complex. Stringent control is necessary over the alumina preparation, milling and extrusion steps. However, treatment of a finished extrudate in accordance with the present invention can convert a catalyst of poor physical characteristics to one of good characteristics. Therefore, a standard catalyst preparation can be used, without especially stringent control at all stages, and then treated in a simple step to produce a catalyst with the preferred physical characteristics.

The invention is illustrated by the following example.

EXAMPLE

Catalyst Preparation

Catalyst A was a CoMo-alumina base catalyst in the form of extrudates.

Catalyst B was prepared by refluxing 500 g of catalyst A with 2.5 liters of deionised water for 3 days. After filtering, the extrudates were dried at 120° C for 16 hours then calcined at 500° C for 2 hours.

Catalyst C was prepared by refluxing 100 g of catalyst A with 0.5 liters of deionised water containing 51 g of magnesium sulphate ($MgSO_4.7H_2O$) for 3 days. After filtering, the extrudates were dried at 120° C for 16 hours then calcined at 500 ° C for 2 hours.

Catalyst Analysis

The following physical properties were obtained:

| | Catalyst A | Catalyst B | Catalyst C |
| --- | --- | --- | --- |
| CoO % wt | 3.7 | 3.4 | 3.1 |
| $MoO_3$ % wt | 13.3 | 13.5 | 11.6 |
| Mg % wt | — | — | 1.75 |
| BET surface area m²/g | 336 | 338 | 340 |
| Average micropore diameter A | 67 | 69 | 62 |
| Micropore volume ml/g | 0.564 | 0.585 | 0.524 |
| Macropore volume ml/g | 0.114 | 0.011 | 0.011 |

Note
(a) Micropores are those less than 300 A diameter.
(b) Macropores are those greater than 300 A diameter.
(b) Micropore volumes were calculated from nitrogen adsorption data, processed using the method of R.W. Cranston and F.A. Inkley - Advances in Catalysis Vol 5 (1957).

The micropore distributions of the three catalysts are given below:

| | Catalyst A | Catalyst B | Catalyst C |
| --- | --- | --- | --- |
| 0 – 30 A diameter ml/g | 0.181 | 0.186 | 0.179 |
| 30 – 90 A diameter ml/g | 0.206 | 0.229 | 0.221 |
| 90 – 150 A diameter ml/g | 0.090 | 0.102 | 0.076 |
| 150 – 300 A diameter ml/g | 0.087 | 0.068 | 0.048 |

These results can also be expressed in terms of the percentage of the micropore volume in a given pore diameter range as follows:

| | Catalyst A | Catalyst B | Catalyst C |
| --- | --- | --- | --- |
| 0 – 30 A diameter ml/g | 32.1 | 31.8 | 34.2 |
| 30 – 90 A diameter ml/g | 36.5 | 39.1 | 42.2 |
| 90 – 150 A diameter ml/g | 16.0 | 17.4 | 14.5 |
| 150 – 300 A diameter ml/g | 15.4 | 11.6 | 9.2 |

Thus, refluxing with water alone (Catalyst B) increased the pore volume in the 30–150 A diameter range compared to the base (Catalyst A). However, when magnesium sulphate was included in the water (Catalyst C), the selectivity was changed. In the 30–90A diameter range, the pore volume was still increased. However, the difference occurred in the 90–150 A range where refluxing with magnesium sulphate solution decreased the pore volume whereas water alone increased the pore volume.

We claim:

1. A method for preparing a catalyst, suitable for the hydrodesulphurisation of hydrocarbons, comprising from 1–10% weight of an iron group metal and from 5–25% weight of a Group VIB metal on a refractory support, the method comprising the step of refluxing the catalyst with an aqueous solution of a salt selected from the group consisting of alkali metals salts, alkaline earth metal salts, rare earth metal salts and transition metal salts, and drying and calcining the treated catalyst.

* * * * *